US 7,700,159 B2

(12) United States Patent
Yonei et al.

(10) Patent No.: US 7,700,159 B2
(45) Date of Patent: Apr. 20, 2010

(54) HYDROPHILIZING WAX COMPOSITION

(75) Inventors: Yasushi Yonei, Settsu (JP); Tadao Shimizu, Kobe (JP); Eiji Kondoh, Kobe (JP)

(73) Assignee: Daikin Industries, Ltd., Osaka (JP)

( * ) Notice: Subject to any disclaimer, the term of this patent is extended or adjusted under 35 U.S.C. 154(b) by 1250 days.

(21) Appl. No.: 10/490,455

(22) PCT Filed: Sep. 19, 2002

(86) PCT No.: PCT/JP02/09600

§ 371 (c)(1),
(2), (4) Date: Mar. 24, 2004

(87) PCT Pub. No.: WO03/027202

PCT Pub. Date: Apr. 3, 2003

(65) Prior Publication Data

US 2005/0003219 A1    Jan. 6, 2005

(30) Foreign Application Priority Data

Sep. 25, 2001 (JP) ............................. 2001-292271

(51) Int. Cl.
*B05D 5/00* (2006.01)
(52) U.S. Cl. ...................... 427/355; 427/369; 106/3; 106/10; 106/270; 106/271; 106/272
(58) Field of Classification Search ......... 106/270–272; 427/322; 252/8.4
See application file for complete search history.

(56) References Cited

U.S. PATENT DOCUMENTS

| 2,807,554 | A | * | 9/1957 | Serey et al. ............... 106/271 |
| 3,341,338 | A | * | 9/1967 | Pater ......................... 106/10 |
| 5,025,054 | A | * | 6/1991 | Yoshida et al. ............. 524/267 |
| 5,300,327 | A | * | 4/1994 | Stark-Kasley et al. ....... 427/387 |
| 5,770,640 | A | * | 6/1998 | Ogawa ..................... 523/210 |
| 6,309,708 | B1 | * | 10/2001 | Mohri et al. ............... 427/387 |
| 6,363,749 | B1 | * | 4/2002 | Jenkner et al. ............. 65/60.3 |
| 6,432,181 | B1 | * | 8/2002 | Ludwig ..................... 106/2 |
| 6,809,145 | B1 | | 10/2004 | Okamura et al. |
| 2001/0056166 | A1 | * | 12/2001 | Mohri et al. ............... 528/9 |

FOREIGN PATENT DOCUMENTS

| EP | 0852251 A1 | 7/1998 |
| EP | 1046667 A2 | 10/2000 |
| JP | 4222805 A | 8/1992 |
| JP | 3042743 U | 8/1997 |
| JP | 9220524 A | 8/1997 |
| JP | 10237364 A | 1/1998 |
| JP | 2000336319 A | 12/2000 |
| JP | 2002047477 A | 2/2002 |
| WO | 9711130 A1 | 3/1997 |
| WO | 0148109 A1 | 7/2001 |
| WO | WO 01/64354 A2 | 9/2001 |

OTHER PUBLICATIONS

International Search Report for PCT/JP02/09600 dated Nov. 19, 2002.

* cited by examiner

*Primary Examiner*—Erma Cameron
(74) *Attorney, Agent, or Firm*—Sughrue Mion, PLLC

(57) ABSTRACT

There is provided a hydrophilizable wax composition which provides a wax coating layer having a hydrophilic surface and imparts a gloss and long-lasting stain-proofing property on a substrate. The hydrophilizable wax composition can form a hydrophilizable wax coating layer by applying the composition containing a hydrophilizing agent and wax component and wiping off the composition, in which the hydrophilizing agent has hydrolyzable groups which are converted into hydrophilic groups by hydrolysis in the presence of water and are condensed to enable the hydrophilizing agent to have a high molecular weight and is, for example, an organometallic compound having a releasable group by hydrolysis, its oligomer and/or a co-oligomer comprising two or more of the compounds.

15 Claims, No Drawings

HYDROPHILIZING WAX COMPOSITION

TECHNICAL FIELD

The present invention relates to a hydrophilizable wax composition which makes surfaces of various substrates and articles hydrophilic and glossy, relates to a method of forming a glossy hydrophilizable surface layer by applying and wiping off the wax composition and relates to an obtained wax-coated article.

BACKGROUND ART

It has been considered that by making surfaces of various substrates hydrophobic (water-repellency), adhesion of stain could be inhibited and good appearance could be maintained for a long period of time, and according to this way of thinking, surface treatment and coating as mentioned below have been carried out by using a fluorine-containing resin excellent in hydrophobic property (water-repellency).
(1) A method of adhering a fluorine-containing resin film to a substrate by thermal bonding (for example, JP8-132571A, JP6-155670A)
(2) A method of applying, on a substrate, a two-liquid curing type fluorine-containing resin composition containing an acrylic polymer as a stain-proofing coating agent (for example, JP3-275860A, JP2-299838A, JP2-299839A)
(3) A method of applying, on a substrate, a heat-meltable fluorine-containing resin composition containing vinylidene fluoride (for example, JP7-3220A, JP6-287334A, JP2-274534A)

In those surface treatments (1) to (3), highly hydrophobic fluorine-containing resins such as tetrafluoroethylene/ethylene copolymer and vinylidene fluoride polymer are used as a fluorine-containing resin to make a surface of a final product highly hydrophobic.

However, according to recent researches, it has been found that staining attributable to exhaust gases from cars and factories is caused by substances inherently having hydrophobic property (lipophilic property) and such lipophilic stain is easily adhered to a hydrophobic surface. Therefore, adhesion of lipophilic stain cannot be prevented by the above-mentioned surface treatments which only have a merit that the stain is easily removed by wiping with a cloth, etc.

There was a trial that a hydrophilic colloid was applied on one surface of a plastic film and another surface thereof was adhered to an outdoor article with an adhesive, thus making a surface of the article hydrophilic (for example, JP8-150681A). However, in this method, a formed hydrophilic surface layer is comparatively thin, and a long-lasting stain-proofing ability and stain-removable property cannot be obtained.

There are similar problems with respect to various products used in a damp site, for example, a sink of systemized kitchen unit, washstand, bath tub, drain pipe, etc. In those products used in a damp site, in many cases, stains are washed away with water by using a detergent or without using a detergent. If a surface thereof is hydrophobic, water-draining property is lowered and water remains in the form of water droplets and an organic substance in the droplets is adhered to the surface of the products as a fur in the form of line or spot. The fur not only lowers appearance of the product but also results in a slime due to propagation of bacteria. Those problems with draining around a damp site are also seen in various drain pipes.

Also there are many cases where fogging occurs on surfaces of various products due to moisture caused by a sudden change in temperature and humidity, and in some cases, prevention of such fogging is demanded strongly. For example, an acrylic resin board, polycarbonate resin board, hard vinyl chloride resin board, etc. which are excellent in transparency are used on a greenhouse, roof of carport, windows of building, etc. Also a film or sheet of soft vinyl chloride resin, polyolefin resin, polyester resin and fluorine-containing resin which are excellent in transparency is used on houses for agriculture in which sunlight has to be taken sufficiently. There is a case where fogging of various glasses, goggles, helmet shield and windows of airplane endangers a human life.

In order to prevent fogging of those board, film and sheet which require transparency, there have been proposed (1) a method of forming a resin mixture prepared by mixing a hydrophilic resin binder such as polymethyl methacrylate or polyvinyl pyrrolidone with an inorganic substance such as colloidal silica or alumina sol, into a board or a film, (2) a method of forming an anti-fogging surface layer by applying an anti-fogging agent comprising an unmodified polyvinyl alcohol and an inorganic substance such as colloidal silica or sodium silicate (for example, JP53-39347A, JP55-99987A, JP57-73059A) and (3) a method of forming an anti-fogging surface layer by applying an anti-fogging agent comprising a modified polyvinyl alcohol having a silyl group and ionic hydrophilic group in its molecule and an inorganic substance mainly on a glass plate or a polyester film (for example, JP59-179685A).

However in the method (1), anti-fogging property when fogging begins (initial anti-fogging property) is poor, and in the method (2), there are problems that wettability to water is insufficient and a surface hardness of a water-absorbed anti-fogging agent layer is lowered and therefore a flaw by scratching easily occurs. In the method (3), since an anti-fogging agent layer is adhered to a polyester substrate with an adhesive, there is a case where peeling of the anti-fogging agent layer arises depending on kind of an adhesive layer, and in addition, complicated production steps are required and cost is high.

Also there is a proposal of a method of forming, on at least one outermost layer of a plastic molded article, a coating film of a hydrophilizable coating composition containing an organometallic compound having a specific releasable group by hydrolysis (for example, JP2000-301054A), which indicates that adhesion of stain can be prevented by hydrophilizing a surface of the plastic article.

However those prior arts relate to a technology of imparting stain-proofing property for preventing adherence of stains by applying a coating composition to form, on a product surface, a coating film having a given strength or by adhering the film to the product surface.

Therefore for forming a coating film, after applying a coating composition, steps for vaporizing an organic solvent, drying and heating are necessary without fail.

On the other hand, there is known an easy method of applying and then wiping off a so-called wax composition to give a gloss on a surface of a substrate. A substantial difference between the wax composition and the coating composition is such that the coating composition is allowed to stand after coated to form a coating film (there is a case where forced drying is carried out but there is no case of touching the film) but in the case of the wax composition, a wiping-off step is necessary without fail after applying the wax composition and the wax component is rubbed on a surface of a substrate by a wiping-off force to adhere and form a wax layer.

In other words, a resin component for forming a film which dissolves in a solvent is essential for a coating composition, but in the case of the wax composition, such a film forming component is not necessary and rather obstructs steps for rubbing and wiping off the wax component. Adhesion of a formed wax layer to a substrate is obtained by wiping off the wax composition and the film of the wax composition itself is not formed into one continuous film unlike a coating film of coating composition. Even if the wax layer is a so-called continuous layer, it is not a film. Therefore though the coating film can be peeled in the form of film from the substrate, the wax layer cannot be peeled from the substrate as an independent film.

Since a wax composition has such characteristics as mentioned above, an effect of surface treatment with the wax composition does not continue long as compared with a coating film. The wax composition is used only as a glossing agent.

As a known wax composition, there is a glossing wax for cars. Some kinds of waxes for cars are endowed with stain-proofing property and wiping-off property in addition to glossing ability, and a component belonging to metal oxides is contained in some of wax compositions.

For example, JP7-196988A discloses a glossing agent comprising a silicone resin having hydroxyl or alkoxyl, wax component, organic or inorganic polishing material and further a solvent and silicone oil, and says that the glossing agent can provide a coating film surface having both of stain-proofing property and water repellency. This patent publication also says that a glossing agent having poor water repellency is relatively low in stain-proofing property.

JP11-21500A discloses a treating agent for a coating surface of car body which has good long-lasting water repellency and comprises a copolymer prepared by radical polymerization of an ethylenic monomer with a silicon compound having an unsaturated group and alkoxyl, organic solvent, wax component and silicone oil. This invention also says that water repellency of the coating film of the treating agent is essential. This patent publication explains that the same thing may be said with respect to many prior patent publications cited as prior arts in JP11-21500A (for example, JP62-132981A, JP4-363375A, JP61-246274A, JP50-157288A, JP1-163280A, JP7-41757A, JP7-109439A)

JP9-310046A discloses a glossing agent prepared by dissolving a wax component and silicone oil in an organic solvent by using a higher alcohol having alkoxyl as an emulsifying agent, optionally adding thereto a swellable layered compound for adjusting a viscosity and a resin component for fixing a coating film and then subjecting the mixture to emulsifying and dispersing in water. This glossing agent is also said to give water repellency and gloss and stain is said to be able to be eliminated when wiping off the glossing agent.

JP5-43840A and JP6-145600A disclose a surface treating agent for treating a coated surface which comprises a metal alkoxide or a polymer thereof, fluorine-containing silane compound, wax component, silicone oil and filler. In those patent publications, the surface treating agent is said to be able to maintain a long-lasting gloss and stain-proofing effect because the surface treating agent is chemically bonded to a coating surface. A coating film of this surface treating agent also has water repellency, and there was obtained a result that a stain-proofing effect is enhanced in the case of a high water repellency.

JP8-269401A and JP9-3408A disclose a glossing agent comprising a cured silicone rubber powder coated with hydrophobic inorganic powder, wax component, silicone oil and organic solvent, and say that adhesion of fur and dust can be prevented for a long period of time.

Any of those surface treating agents (glossing agents) containing a wax component make a treated surface hydrophilic and thereby enhance both of stain-proofing property and gloss.

Also JP8-60100A discloses that dispersions of aqueous solvents such as water and alcohols which contain a reaction product of colloidal silica with an organosilicate compound having 2 or 3 alkoxyl groups or a reaction product further reacted with melamine resin can impart a long-lasting gloss to surfaces of wood, synthetic leather, etc., can inhibit sliding property thereof and form the surfaces having excellent scrub resistance. This patent publication also discloses that a tetra-functional alkoxysilane such as tetraalkoxysilane may be added when preparing the reaction product and usual additives such as a wax component, silicone oil and metal powder may be added. However there is no teaching at all with respect to how to add water-repellent components such as wax component and silicone oil and what characteristics the obtained composition exhibits. What are disclosed therein are only aqueous glossing agents which are subjected to coating and impregnating without wiping off.

The present invention was completed as a result of unexpected finding that in a water-repellent surface-treating agent containing wax, when a specific hydrophilizing agent which can make a surface of substrate hydrophilic is added thereto, not only stain-proofing properties such as prevention of stain adhesion and stain removability are enhanced but also a glossing effect of the wax component is not lowered. Such a finding made a complete change in conventional way of thinking that water repellency is an essential point of a wax composition for exhibiting stain-proofing properties and glossing.

As mentioned above, it is known that a hydrolyzable organometallic compound is added to a coating composition comprising a resin as a binder to make an obtained coating film hydrophilic. In such a technology, a hydrophilizing effect can be exhibited when the coating composition is formed into a continuous coating film, and it has never been considered to apply such a technology to a treating agent not forming a coating film, particularly to a treating agent containing wax of which essential point has been considered to be water repellency.

An object of the present invention is to provide a hydrophilizable wax composition which can enhance and maintain stain-proofing properties without lowering gloss by adding a substance accelerating hydrophilization to a surface treating agent containing a wax.

DISCLOSURE OF INVENTION

Namely, the present invention relates to a hydrophilizable wax composition which contains a wax component and a hydrophilizing agent having hydrolyzable groups which are converted into hydrophilic groups by hydrolysis in the presence of water and are simultaneously condensed to enable the hydrophilizing agent to have a high molecular weight, and can form a hydrophilizable wax coating layer when applied on a substrate and wiped off.

Preferred as a hydrophilizing agent is an organometallic compound having a releasable group by hydrolysis, an oligomer thereof and/or a co-oligomer comprising two or more of the organometallic compounds.

Preferred as the organometallic compound is an organometallic compound represented by the formula (1):

(1)

wherein a is 0 or an integer of 1 to 6, b is 0 or an integer of 1 to 5, c is 0 or an integer of 1 to 6 (a and c are not zero at the same time, a+b+c≧3, b/(a+c)=0 to 1), X are the same or different and each is hydrogen atom or a monovalent organic group which has 1 to 5,000 carbon atoms and may contain oxygen atom, nitrogen atom, fluorine atom and/or chlorine atom, M is a metal atom having at least three valences, $R^1$ are the same or different and each is hydrogen atom, a siloxane residue or a monovalent organic group which has 1 to 1,000 carbon atoms and may contain oxygen atom (except oxygen atom at an end of molecular chain), nitrogen atom, fluorine atom and/or chlorine atom, $R^2$ are the same or different and each is an organic group which has 1 to 20 carbon atoms, has a chelating ability and may contain oxygen atom (except oxygen atom at an end of molecular chain), nitrogen atom, fluorine atom and/or chlorine atom.

Particularly preferred is a tetra-functional hydrolyzable silane compound in which b and c are 0 in the formula (1) or an organometallic compound in which $R^1$ is a fluorine-containing organic group in the formula (1).

The wax composition of the present invention may contain or may not contain a filler, and also may contain an organic solvent or photo-catalyst particles.

The present invention also relates to a method of forming, on a surface of a substrate, a hydrophilizable wax coating layer being glossy and having durability, which comprises applying the hydrophilizable wax composition on the surface of the substrate and wiping off the composition, thereby converting hydrolyzable groups of the hydrophilizing agent into hydrophilic groups in the presence of water and simultaneously condensing the hydrophilizing agent to make a molecular weight thereof high.

The wax composition may be applied directly to the surface of the substrate and wiped off or may be applied to a surface of coating film on the substrate and wiped off.

Further the present invention relates to a method of repairing a scaled portion of a coating film on a substrate to make a surface thereof hydrophilic and glossy, which comprises applying the above-mentioned hydrophilizable wax composition on the scaled portion of the surface of the substrate and wiping off the composition, thereby forming a layer of the hydrophilizable wax composition at least on the scaled portion of coating film.

Examples of the substrate are a metallic substrate, plastic substrate, ceramic substrate, wood and the like, and examples of the ceramic substrate are a glass substrate, concrete substrate, mortar substrate, tile, natural stone and the like.

Further the present invention relates to a wax-coated article having a layer of the above-mentioned hydrophilizable wax composition as an outermost layer.

Examples of the wax-coated article are bodies of car, train and airplane, advertisement panel, vending machine, tent and the like.

BEST MODE FOR CARRYING OUT THE INVENTION

First, the hydrophilizing agent used in the present invention may be one having hydrolyzable groups which are converted into hydrophilic groups by hydrolysis in the presence of water and are simultaneously condensed to make a molecular weight of the agent high unless workability in applying the wax composition on a substrate and wiping off the composition is lowered.

Therefore, the hydrophilizing agent used in the present invention is an agent that, before the hydrolyzation and condensation, the agent can be admixed to a wax component uniformly and does not make lower workability in applying and wiping off the wax composition, and after the hydrolyzation and condensation, the agent can form a durable coating layer. In the present invention, "high molecular weight" is construed on the basis of this aspect.

Preferred as a hydrophilizing agent is an organometallic compound having a releasable group by hydrolysis, an oligomer thereof and/or a co-oligomer comprising two or more of the organometallic compounds. The organometallic compound encompasses those oligomer and co-oligomer unless otherwise noted.

Examples of preferred organometallic compound are the compounds represented by the above-mentioned formula (1). Those organometallic compounds, oligomers thereof and co-oligomers comprising two or more thereof are described in JP2000-301054A Those organometallic compounds have a function to make a surface of a wax coating layer hydrophilic, and more preferred substituent and molecular weight may be selected and used depending on desired functions and application.

First, an embodiment of the organometallic compound represented by the formula (1) which is suitable from overall point of view in the present invention is explained below.

The above-mentioned a is 0 or an integer of from 1 to 6 from the viewpoint of surface orientation (property that the hydrolyzable groups of the organometallic compound face toward the surface of the wax coating film, which makes hydrolysis easy at the surface), hydrolyzability and releasing property, and is preferably an integer of from 2 to 4.

The above-mentioned b is 0 or an integer of from 1 to 5 from the viewpoint of surface orientation and hydrophilic property, and is preferably 0 or 1.

The above-mentioned c is 0 or an integer of from 1 to 6 from the viewpoint of surface orientation, hydrolyzability and releasing property, and is preferably 0 or an integer of from 1 to 3.

A sum of a, b and c is determined by the valence of metal atom M, and in the formula (1), since either of $OR^1$ or $R^2$ is necessary from the viewpoint of stain-proofing property, surface orientation and hydrolyzability, there is no case where both of a and c are zero at the same time, and the sum of a, b and c is at least 3.

The above-mentioned X may be hydrogen atom and is preferably a monovalent organic group of, for example, the following (1) to (3) which has 1 to 5,000 carbon atoms and may contain oxygen atom, nitrogen atom, fluorine atom and/or chlorine atom.

(1) As the organic group X, there are, for example, $H(CH_2)_p$, $(CH_3)_2CH$, $H(CH_2)_pC=O$, $F(CF_2)_q(CH_2)_p$, $(CF_3)_2CH$, $H(CF_2)_q(CH_2)_p$ and the like wherein p is 0 or an integer of from 1 to 6, q is an integer of from 1 to 10, a part of fluorine atoms may be substituted with chlorine atoms. Those organic groups may have a linear or branched chain.

Examples thereof are, for instance, $CH_3$, $CH_3CH_2$, $CH_3CH_2CH_2$, $(CH_3)_2CH$, $CF_3CH_2$, $CF_3CF_2CH_2$, $(CF_3)_2CH$, $F(CF_2)_4CH_2CH_2$, $F(CF_2)_8CH_2CH_2$, $H(CF_2)_4CH_2$ and the like. From the viewpoint of surface orientation, hydrolyzability and releasing property, $CF_3CF_2CH_2$ and $(CF_3)_2CH$ are preferred.

(2) Also as the organic group X, there are, for example, organic groups having a functional group such as $NH_2$, secondary amino group, tertiary amino group, OH, NCO, $CO_2H$, $CO_2Na$, $CO_2K$, $SO_3H$, $SO_2Na$, $SO_3K$, epoxy group, oxyethylene group ($CH_2CH_2O$) and the like.

Examples thereof are, for instance,

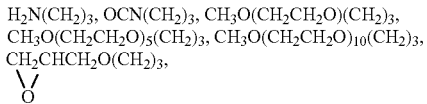

and the like.

From the viewpoint of hydrophilic property, compatibility and adhesion, $OCN(CH_2)_3$ and $CH_3O(CH_2CH_2O)_5(CH_2)_3$ are preferred.

(3) Further as the organic group X, there are, for example, polymerizable organic groups which may have oxygen atom, nitrogen atom, fluorine atom, chlorine atom, silicon atom or the like.

Examples thereof are, for instance, $CH_2=C(CH_3)CO_2(CH_2)_3$, $CH_2=CH$, $CH_2=CHCH_2$, $CH_2=CHO(CH_2)_3$, $CH_2=CHOCO(CH_2)_3$, $CH_2=CHC_6H_4$, $CH_2=CHCO_2(CH_2)_3$ and the like. From the viewpoint of polymerizability and availability, $CH_2=C(CH_3)CO_2(CH_2)_3$ and $CH_2=CHO(CH_2)_3$ are preferred.

In the present invention, also preferred are polymers or copolymers which are prepared by polymerization or copolymerization of the compound represented by the formula (1) having a polymerizable organic group and have a molecular weight of from 500 to 100,000, preferably from 1,000 to 20,000.

The above-mentioned $R^1$ are the same or different and each may have oxygen atom, nitrogen atom, fluorine atom and/or chlorine atom, and from the viewpoint of surface orientation, hydrolyzability and releasing property, $R^1$ is a monovalent organic group having 1 to 1,000 carbon atoms, a siloxane residue or hydrogen atom. The above-mentioned number of carbon atoms is preferably from 1 to 100, more preferably from 1 to 16.

Among the above-mentioned $R^1$, examples of the preferred monovalent organic group are, for instance, $H(CH_2)_m$, $(CH_3)_2CH$, $H(CH_2)_mC=O$, $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_mCF(CF_3)C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_mC=ONR^3$, $H(CF_2)_n(CH_2)_mC=ONR^3$, $F(CF_2)_n(CH_2)_mC=CH_2$, $H(CF_2)_n(CH_2)_mC=CH_2$, $F(CF_2)_n(CH_2)_mC=CF_2$ and $H(CF_2)_n(CH_2)_mC=CF_2$, wherein m is 0 or an integer of from 1 to 6, n is an integer of from 1 to 10, $R^3$ represents an alkyl group which has 1 to 6 carbon atoms and may be linear or branched.

Examples of those organic groups are, for instance, $CF_3CH_2$, $CF_3CF_2CH_2$, $CF_3CHFCF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$ and the like. From the viewpoint of surface orientation, hydrolyzability and releasing property, preferred are $CF_3CH_2$, $CF_3CF_2CH_2$, $CF_3CHFCF_2CH_2$, $CF_3(CF_2)_2CH_2$, $CF_3(CF_2)_3CH_2CH_2$, $CF_3C=O$ and $CF_3CF_2C=O$, and further preferred are $CF_3CH_2$, $CF_3CF_2CH_2$ and $CF_3CHFCF_2CH_2$.

Among the above-mentioned $R^1$, examples of the siloxane residue are, for instance, $(Si(OR^1)_2O)_nR^1$ and the like, wherein $R^1$ is the same as the monovalent organic group among the above-mentioned $R^1$.

The above-mentioned $R^2$ may be the same or different and each is an organic group which may have fluorine atom and/or chlorine atom, has a chelating ability and has 1 to 20, preferably 2 to 10 carbon atoms from the viewpoint of surface orientation, hydrolyzability and releasing property.

In the present invention, effects of providing excellent storage stability, reactivity, solubility and compatibility can be obtained by using the organometallic compound in which such an organic group having a chelating ability is bonded.

The organic group having the chelating ability as mentioned above can be derived from compounds as follows: for example, β-diketones such as 2,4-pentanedione and 2,4-heptanedione; keto-esters such as methyl acetoacetate, ethyl acetoacetate and butyl acetoacetate; hydroxycarboxylic acids such as lactic acid, methyl lactate, ethyl lactate, ammonium lactate, salicylic acid, methyl salicylate, ethyl salicylate, malic acid, ethyl malate, tartaric acid, ethyl tartrate, an ester or a salt thereof; keto-alcohols such as 4-hydroxy-4-methyl-2-pentanone, 4-hydroxy-2-pentanone, 4-hydroxy-2-heptanone and 4-hydroxy-4-methyl-2-heptanone; amino-alcohols such as monoethanolamine, diethanolamine, triethanolamine, N-methylmonoethanolamine, N-ethylmonoethanolamine, N,N-dimethylethanolamine and N,N-diethylethanolamine; active hydrogen compounds with enolic form such as diethyl malonate, methylolmelamine, methylolurea and methylolacrylamide; and the like. From the viewpoint of surface orientation, more preferred are compounds which are obtained by substituting a part or the whole of hydrogen atoms of the above-mentioned compounds with fluorine atoms and/or chlorine atoms.

Examples of the above-mentioned metal atom M are, for instance, B, Al, Ga, In, Tl, Sc, Y, La, Ac, Si, Ge, Sn, Pb, Ti, Zr, Hf, As, Sb, Bi, V, Nb, Ta, Te, Po, Cr, Mo, W, At, Mn, Tc, Re, Fe, Co, Ni, Ru, Rh, Pd, Os, Ir, Pt and the like. From the viewpoint of easiness in synthesis and availability, preferred are Al, Ti, B, Zr and Si, and particularly preferred is Si.

In the present invention, examples of the oligomer and co-oligomer are linear, branched, cyclic and three-dimensional oligomers and co-oligomers.

In the present invention, a degree of polymerization of the oligomer and co-oligomer is such that condensation is carried out up to an extent of the oligomer and co-oligomer not having a high molecular weight according to the above-mentioned aspect of "high molecular weight". The degree of polymerization is preferably from 2 to 100, further preferably from 4 to 20. If the degree of polymerization is smaller, a boiling point of the oligomer or co-oligomer is easily lowered, and the oligomer or co-oligomer is easily vaporized at coating and is hardly incorporated into a coating film. If the degree of polymerization exceeds 100, there is a tendency that control of the degree of polymerization at synthesis is difficult, a viscosity of the oligomer or co-oligomer easily becomes high and workability becomes inferior. When in the formula (1), a is 4, b and c are zero, M is Si and fluorine atom is contained, it is preferable that the degree of polymerization of the oligomer or co-oligomer is more than 4 and not more than 30 from the viewpoint of workability, appearance of a treated surface and storage stability of a wax composition.

Examples of other hydrophilizing agent which can be used in the present invention are, for instance, silicate oligomers represented by $CH_3O(Si(OCH_3)_2O)_nCH_3$ (n=20) and $C_2H_5O(Si(OC_2H_5)_2O)_mC_2H_5$ (m=8) and the like.

In the present invention, the hydrophilizable wax composition containing the hydrophilizing agent such as the above-mentioned organometallic compounds is applied on various substrates which may have a coating film and is then wiped off, thereby forming a wax coating layer.

In the present invention, it is preferable that the above-mentioned hydrophilizing agent is contained in an amount of not less than 50 parts by weight, preferably not less than 80 parts by weight and not more than 500 parts by weight, preferably not more than 400 parts by weight based on 10 parts by weight of the wax component. When the amount is within the above-mentioned range, hydrophilizing ability (stain-proofing property), workability in wiping-off and an effect of glossing become good.

The hydrophilizable wax composition of the present invention comprises the above-mentioned hydrophilizing agent, wax component and as case demands, a filler and organic solvent. It is desirable that as case demands, photo-catalyst particles are added thereto.

As mentioned above, the wax component is used to adhere to a substrate or a coating film and form a wax coating layer and is not a material which forms a coating film like a resin as a film forming component of a coating composition. Generally the wax component has a molecular weight larger than that of a resin as a film forming component of a coating composition and is not dissolved in an organic solvent or only swells in the solvent (It is usual that a resin for coating composition is dissolved in a solvent). The wax component has an action of giving gloss to a substrate by wiping off after the application (A coating composition is not wiped off after the application).

The wax component to be used is not limited particularly, and known wax components can be used. Examples thereof are, for instance, vegetable waxes such as carnauba wax, haze wax, ouricury wax and esparto wax; animal waxes such as bees wax, insect wax, shellac wax and spermaceti wax; petroleum waxes such as paraffin wax, micro crystal wax, polyethylene wax, ester wax and oxidized wax; mineral waxes such as montan wax, ozokerite and ceresine; modified wax, glyceride, synthetic ketone amine amide, hydrogenated wax and the like.

Examples of other wax component are higher fatty acids such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate; amides such as acetamide, propionic acid amide, palmitic acid amide, stearic acid amide and amide wax; higher fatty amines such as stearylamine, behenylamine and palmitylamine; and the like.

Those wax components can be used alone or in a mixture of two or more thereof.

Examples of preferred wax component are paraffin wax, carnauba wax, polyethylene wax and various amide waxes, and particularly preferred are paraffin wax, carnauba wax and polyethylene wax from the point that a glossing agent being excellent especially in workability can be prepared.

To the wax composition of the present invention may be added an organic solvent in order to disperse or swell (or dissolve, as case demands) the above-mentioned hydrophilizing agent and wax component for enhancing workability. Examples of the organic solvent are petroleum hydrocarbons and alcohols.

The petroleum hydrocarbons are not limited particularly. Examples thereof are, for instance, one or more of petroleum naphtha, solvent naphtha, petroleum ether, petroleum benzine, isoparaffin, normal paraffin, decalin, industrial gasoline, ligroin and kerosene. Among them, preferred are kerosene, petroleum naphtha and solvent naphtha.

Preferred as alcohols are those having 1 to 20 carbon atoms. Examples thereof are, for instance, one or more of monovalent alcohols such as methyl alcohol, ethyl alcohol, n-propyl alcohol, iso-propyl alcohol, n-butyl alcohol, iso-butyl alcohol, sec-butyl alcohol, tert-butyl alcohol, allyl alcohol and crotyl alcohol; divalent alcohols such as ethylene glycol, propylene glycol and diethylene glycol; glycol ethers such as ethylene glycol monomethylether, ethylene glycol monoethylether, ethylene glycol monobutylether and ethylene glycol dimethylether.

The organic solvent functions to disperse each component of the wax composition and decrease a viscosity of the wax composition, thereby making a coating work easy. The organic solvent is used in an amount exhibiting such functions. The amount is not less than 10% by weight, preferably not less than 30% by weight and not more than 95% by weight, preferably not more than 85% by weight based on the whole wax composition. If the amount exceeds 95% by weight, since the amounts of the hydrophilizing agent and wax component are relatively decreased, hydrophilizing action and glossing effect become insufficient. On the other hand, if the amount is less than 10% by weight, there is a tendency that a viscosity is increased and workability in applying and wiping off is lowered.

A gloss appears by wiping off the wax composition after the application thereof. In order to make the wiping-off work easy, a filler may be contained therein.

As a filler, there can be used known fillers in the form of powder, and any of inorganic powder and organic powder can be used.

Examples of the inorganic powder are, for instance, powders of kaoline, talc, quartz rock, quartz sand, diatomaceous earth, silicic anhydride, pearlite, calcium carbonate, zeolite, alumina, aluminum hydroxide, hydrous silicate, chromium oxide, titanium oxide, zinc oxide, iron oxide, zirconium oxide, silicon oxide, cerium oxide, magnesium oxide, calcium fluoride, bentonite, montmorillonite, Shirasu balloons, mica, calcium silicate, zirconium silicate, diamond, silicon carbide (carborundum), glass and various ceramics.

Examples of the organic powder are powders of polyolefin such as polyethylene, cellulose, polytetrafluoroethylene, tetrafluoroethylene/hexafluoropropylene copolymer, polyvinylidene fluoride, higher fatty acid bisamide, higher fatty acid metal soap, insoluble silicone resin, polyamide, polystyrene and acrylic resin and amino acid powder.

Effects of adding the filler are such that there is no fear of damaging a surface of a substrate at applying and wiping-off the wax composition, the wax component can also be removed at wiping-off work and as a result, the wiping-off work can be carried out relatively in a short period of time. An average particle size of the filler exhibiting such effects is usually not more than 10 μm and not less than about 0.5 μm, preferably from 1 to 5 μm.

Also another effect of adding the filler is an effect of inhibiting separation of the wax component and enhancing stability of the wax composition. The fillers giving such an effect of enhancing stability are those having an average particle size of not more than 1 μm among the above-mentioned fillers. The use of this stability-enhancing agent together has an advantage that even if the amount of the filler is decreased, the above-mentioned effects of its own can be exhibited.

The amount of the filler is not more than 200 parts by weight, preferably not more than 100 parts by weight based on 10 parts by weight of the wax component. If the amount exceeds 200 parts by weight, there is a tendency that the hydrophilizing agent is also wiped off and hydrophilic property of an applied surface is lowered.

In the case of a wax composition containing a filler, a force is required for wiping-off the wax composition (heavy wiping-off work) and workability for long hours of work is inferior. When the filler is not contained, the above-mentioned advantage cannot be obtained but the wax composition can be prepared in the form of liquid and has advantages that a force is not required for wiping-off and the wiping-off work becomes easy.

Accordingly, in the present invention, whether or not a filler is added can be determined depending on working conditions, kind of articles to be coated and form of a wax composition. In order to enhance stability of the composition and workability in wiping-off work in a short period of time, the filler may be added in an amount of not less than 20 parts by weight, preferably not less than 30 parts by weight based on 10 parts by weight of the wax component. It is a matter of course that the filler can be used in an amount of less than 20 parts by weight in consideration of proportions of an abrasive agent and photo-catalyst particles which are explained infra.

Also when carrying out abrasion (surface abrasion) of stain and rust cohered on a substrate surface simultaneously, a known abrasive agent may be added as case demands. As an abrasive agent, there are usually used powders having a relatively large particle size and possessing an abrasion ability, among the above-mentioned fillers.

Further separately from the filler or abrasive agent, there can be blended fine particles of inorganic oxides which exhibit catalytic action (photo-catalytic action), particularly photo-oxidizing (decomposing) catalytic action when subjected to excitation with light. The photo-catalyst particles differ from the filler and abrasive agent in the point that the filler and abrasive agent do not exhibit a photo-catalytic action and also differ in a particle size. As the photo-catalyst particles, those having a very small average particle size of not more than 100 nm, preferably from 1 to 30 nm, particularly preferably from 3 to 20 nm are used. This not only is useful for increasing a photo-catalytic surface area but also makes it easy for the photo-catalyst particles to remain in the formed wax coating layer. Further since those particles are fine, even if they remain in the wax coating layer, transparency and gloss of the coating layer are hardly affected. Also in order to obtain good dispersibility, it is possible to use photo-catalyst particles in the form of non-aqueous sol.

The remaining photo-catalyst particles can photo-oxidize, decompose and remove organic stains (for example, pitch, tar, etc.) which are not removed only by surface hydrophilizing action of a hydrophilizing agent. Since the photo-catalyst particles oxidize and decompose not only organic stains but also organic components such as wax component, the photo-catalyst particles are easily released from a wax coating layer in the case of conventional wax compositions containing no hydrophilizing agent. However when a hydrophilizing agent having affinity for photo-catalyst particles which are inorganic oxides is used together, the photo-catalyst particles remain in the cured wax coating layer containing the hydrophilizing agent and can maintain a photo-catalytic effect for a long period of time.

Examples of the photo-catalyst particles are, for instance, particles of crystalline oxides having photo-catalytic activity, among titanium oxide, zinc oxide, iron oxide, zirconium oxide, cerium oxide, tin oxide, dibismuth trioxide, tungsten trioxide and strontium titanate. Particularly preferred is anatase-type titanium dioxide. The photo-catalyst particles are used in a small amount in consideration of decomposition of organic substances such as wax component. The amount thereof is concretely not more than 10 parts by weight, preferably not more than 5 parts by weight, particularly preferably from 0.1 to 3.5 parts by weight based on 10 parts by weight of the wax component.

To the hydrophilizable wax composition of the present invention may be added silicone oil as case demands.

The silicone oil is not limited particularly. Examples thereof are, for instance, one or more of dimethyl silicone, phenyl silicone, amino-modified silicone, alkyl-modified silicone, vinyl-modified silicone, methyl phenyl silicone and polyether-modified silicone. From the point of hardly disturbing surface-hydrophilizing action, dimethyl silicone and polyether-modified silicone are particularly preferred.

A viscosity of silicone oil is usually from 1 to 15,000 c/s, preferably from 2 to 10,000 c/s.

A content of silicone oil is usually not less than 0.1 times, preferably not less than 0.3 times and not more than 5.0 times, preferably not more than 4.0 times to 100 parts by weight of the wax component. If the content of silicone oil is more than 5.0 times, wiping-off property is lowered and surface hydrophilization directed by the present invention is lowered.

In the present invention, other components such as a rust-preventing agent, lower polyalcohol, fluorescent pigment, dust-preventing agent, hydrolyzing accelerator, ultraviolet absorber and photo-stabilizer can be added in proper amounts as case demands.

The wax composition of the present invention can be prepared by mixing each component in order or batchwise.

For example, the wax component is dispersed or dissolved in an organic solvent, and then a hydrophilizing agent and further a filler are added and the mixture is stirred and mixed for dispersing uniformly.

The present invention also relates to the method of hydrophilizing a surface of a substrate and giving gloss thereon which comprises applying the above-mentioned hydrophilizable wax composition on the surface of a substrate and wiping off the composition to form a layer of hydrophilizable wax composition on the surface of a substrate.

The wax composition may be applied directly to the surface of a substrate and wiped off or may be applied to a surface of coating film on a substrate and wiped off.

Further the present invention relates to the method of repairing a scaled portion of a coating film on a substrate to make a surface thereof hydrophilic and glossy, which comprises applying the above-mentioned hydrophilizable wax composition on the scaled portion of coating film on the surface of the substrate and wiping off the composition, thereby forming a layer of the hydrophilizable wax composition at least on the scaled portion of coating film.

In the hydrophilizing and glossing method of the present invention, the hydrophilizing and glossing may be carried out in a factory before delivery for hydrophilizing and glossing of a product surface at a final production stage or may be carried out for removing stain and increasing gloss on a surface of a product during the use thereof like a so-called car wax and floor wax.

The method of applying the composition is not limited particularly, and may be selected optionally, depending on a form of wax composition (whether the composition is in the form of semi-solid, paste or emulsion) and a viscosity thereof, from a method of rubbing with a sponge or cloth, a method of applying with a brush or the like and a method of applying with a sprayer.

In the method of the present invention, the wiping-off after the application is an essential step and the wiping-off work may be carried out through usual method of using a cloth. By this wiping-off work, the wax component is rubbed and adhered strongly to the substrate surface, thereby forming a hydrophilizable wax coating layer having a gloss.

In the present invention, surface hydrophilization is exhibited when the hydrolyzable functional group of the hydrophilizing agent is hydrolyzed in the presence of water (water at washing, rainwater, etc.) to be converted to hydroxyl. The wax composition can be adhered to the substrate for a long period of time because hydrohilizing agents undergo condensation reaction with each other to make a molecular weight high and are bonded to functional groups (hydroxyl, etc.) of the substrate.

Examples of material of the substrate are, for instance, metallic materials such as iron (galvanized steel plate, tin-plate, etc.), aluminum, stainless steel and titanium (including alloys thereof); thermoplastic resins such as polyvinyl chloride, ABS resin, polyester, polycarbonate and polyamide; thermosetting resins such as urethane resin, epoxy resin and melamine resin; various ceramics, glass, concrete, mortar, tile, natural stone, wood and the like. A form of a substrate is not limited particularly and the substrate may be in the form of film, sheet, plate, bar and other various molded articles. Also the wax composition of the present invention is not limited to the use for repairing. The wax composition may be formed as an outermost layer on a film of a coating composition formed on the above-mentioned substrates.

Examples of the film of a coating composition to be formed on the substrate are, for instance, clear coating and color coating films of fluorine-containing resin coating composition, acrylic resin coating composition, urethane resin coating composition, acryl urethane resin coating composition, polyester resin coating composition, vinyl acetate resin coating composition, silicone resin coating composition, epoxy resin coating composition, melamine resin coating composition and lacquer coating. Those coating compositions can be applied in the form of solvent-based composition, aqueous composition and powder composition.

Further the present invention relates to the wax-coated article having a layer of the wax composition as an outermost layer.

Examples of the wax-coated article are car bodies for car, train, bus, truck and various vehicles for industrial use, and bodies of airplane and vessel. For glossing, removal of stain and prevention of adherence of stain of those articles, wax has been used. However according to the wax composition of the present invention, a hydrophilized state of a surface of those articles can be maintained for a long period of time.

The wax-coated article is also useful as a product having stain-removable property. As mentioned above, there are hydrophilic and hydrophobic stains which are adhered to various products in an environment thereof. For example, dusts floating in the air outside and inside of room are adhered to and deposited on the products and result in visible stains. In case of building materials and outdoor products, stains thereon are flowed by rainwater, etc. and result in staining in the form of line. Also even in case of products to be used indoor, in addition to dusts, there are many stains adhering thereto such as oily stains on tableware, ventilation fan, kitchen hood and table in a kitchen; stain of nicotine of cigarettes on furniture, wall, electric appliances, roll blind, screen, tatami-mat, sofa, table, desk, door, cover for illumination, ceiling, carpet and floor mat in a living room; wax of dirt and soap refuse on bath tub, pail, wall, bath tub cover, ventilation fan and floor in a bath or lavatory; and stain on toilet stool and bowl.

The wax-coated article of the present invention is also useful as a product having anti-fogging property. When a hydrophilizable coating layer of the present invention is formed on a surface, wettability of hydrophilic surface is enhanced and dew resulting from a change in temperature and humidity is hardly formed, thereby exhibiting excellent anti-fogging property.

Examples of places and products requiring anti-fogging property are various windows, display cases, mirrors, illumination covers, etc. which are set at places where fogging is caused by moisture generated due to a difference in temperature; lens, goggles, helmet shield, various covers such as a cover for solar cell, etc. requiring transparency and light transmittance; various covers, films, sheets, etc. for houses for agriculture and greenhouse; and the like.

Further the wax-coated article of the present invention is useful as a product in which prevention of dew formation is required. When a hydrophilizable coating layer of the present invention is formed on surfaces of the product, there is less formation of dew caused by moisture in the air outside and inside of room and therefore, falling of waterdrops does not occur and there is no adverse effect on various products and plants. Further even if rainwater and spray of water are attached to a product, there are few droplets remaining on the product. Also since a continuous uniform water film is formed on the surface of the product without forming water droplets thereon, even if freezing occurs, deviation of view sight can be minimized. Namely, in the present invention, property for preventing dew formation is a concept encompassing not only a property for preventing dewing of ambient moisture and formation of waterdrops but also a property for preventing alien water from remaining on the surface as waterdrops.

Examples of places and products which require property for preventing dew formation are interior products such as wall paper, window, chandelier, etc. in addition to the above-mentioned places and products requiring anti-fogging property.

Further the wax-coated article of the present invention is useful as a product having antistatic property. When a hydrophilizable coating layer of the present invention is formed on a surface of the product, since an electrically conductive layer is distributed over an outermost layer of a coating layer and a coating film is closely adhered to a substrate, the hydrophilizable coating layer is not flowed away by rainfall with a lapse of time unlike the case of simply coating a hydrophilizing agent such as a surfactant. Thus a function of hydrophilization can be maintained, a water film as an electrically conductive layer is easily formed and electrostatic charging can be prevented for a long period of time.

Examples of places and products which require antistatic property are various products used at places such as a clean room for production of semiconductors where adherence of dusts is required to be inhibited as much as possible; electric and electronic products, precision appliances and in addition, peripheral products thereof such as flexible disk, video tape, audio tape and compact disk in which lowering of performance and malfunction are caused by adherence of dusts; display case, lens, window, mirror, outdoor display articles (advertisement panel, signs, etc.), housing facilities, sound-proof wall, carport, house for agriculture, tent house, tent for eaves, various leisure products, camera case, camera cover, camera filter, fishing things, ski board, shoes and bag, in which adherence of dusts results in lowering of a property for keeping clear pattern, appearance, transparency and functions thereof; and the like.

Examples of particularly representative products are car body; film and sheet for agriculture; film, sheet and board for outdoor products; film, sheet, board and tube for building materials; and the like. More concretely there are a film and sheet for house for agriculture, a cover film for solar cell, sheet for tent, protection cloth for building, outdoor displays (advertisement panel, sign), window, ceiling of carport, sound-proof wall of highway, kitchen utensils, bath facilities (wall, appliances), various housing facilities (wall material, illumination, blind, trough, etc.), screen, roll blind, tatami-mat, table cloth, table and the like.

The present invention is then explained by means of examples, but is not limited to them.

EXAMPLE 1

A hydrophilizable wax composition was prepared by mixing the following components in amounts shown in Table 1 and characteristics thereof mentioned infra were determined. The results are shown in Table 1.

(Components)

Hydrophilizing Agent (Organometallic Compound)

(With respect to the following compounds, there are isomers thereof. The following structural formulae show represented structures thereof. The isomers are branched, cyclic or three-dimensional.)

A-1:
  $RO(-Si(OR)_2-O)_4-R$ (R are $-CH_3$ and $-CH_2C_2F_5$, and $-CH_2C_2F_5/-CH_3$ is 0.3)

A-2:
  $RO(-Si(OR)_2-O)_4-R$ (R are $-CH_3$ and $-CH_2C_2F_5$, and $-CH_2C_2F_5/-CH_3$ is 0.5)

A-3:
  $RO(-Si(OR)_2-O)_4-R$ (R are $-CH_3$ and $-CH_2C_2F_5$, and $-CH_2C_2F_5/-CH_3$ is 0.7)

A-4:
  $RO(-Si(OR)_2-O)_{10}-R$ (R are $-CH_3$ and $-CH_2CF_2CFHCF_3$, and $-CH_2CF_2CFHCF_3/-CH_3$ is 0.3)

A-5:
  $RO(-Si(OR)_2-O)_4-R$ (R are $-CH_3$ and $-CH_2CF_2CFHCF_3$, and $-CH_2CF_2CFHCF_3/-CH_3$ is 0.5)

A-6:
  $RO(-Si(OR)_2-O)_{15}-(-Si(OR)(R)-O)_3-R$ (R are $-CH_3$)

A-7:
  $RO(-Si(OR)_2-O)_{10}-(-Si(OR)(R)-O)_{10}-R$ (R are $-CH_3$)

A-8:
  $RO(-Si(OR)_2-O)_4-R$ (R are $-CH_3$)

A-9:
  $RO(-Si(OR)_2-O)_8-R$ (R are $-C_2H_5$)

A-10:
  $RO(-Si(OR)_2-O)_{20}R$ (R are $-CH_3$)

Wax Component

B-1:
  Carnauba wax

B-2
  Paraffin wax

Filler

C-1:
  Calcium carbonate powder (average particle size: 3 μm)

C-2: (As a Stability-enhancing Agent)
  Silicic anhydride powder (average particle size: 10 nm)

Photo-catalyst Particles:

E-1:
  Anatase-type titanium dioxide particles powder (average particle size: 6 nm) (tradename TKP-101 available from Tayca Corporation)

E-2:
  Anatase-type titanium dioxide particles of sol type (average particle size: 6 nm) (titanium oxide, content: about 20% by weight, tradename TKS-251 available from Tayca Corporation)

Organic Solvent

D-1:
  Normal paraffin

D-2
  Kerosene (Process for Preparation)

A 200 ml stainless steel vessel was charged with an organic solvent (23 g of normal paraffin and 23 g of kerosene) and thereto was added a wax component (2 g of carnauba wax and 2 g of paraffin wax), followed by dissolving at 70° to 85° C. and sufficiently mixing with a stirrer. Then 40 g of an organometallic compound A-1 was added thereto and sufficiently mixed with a stirrer to be dispersed. Lastly, a filler (5 g of calcium carbonate and 5 g of silicic anhydride powder) was added, followed by sufficiently mixing with a stirrer to obtain a wax composition in the form of paste uniformly dispersed.

(Formation of Wax Coating Layer)

A coating film of a weather resistant fluorine-containing coating composition (white coating) was formed on a 1 mm thick chemically treated aluminum plate, and thereon was uniformly applied the wax composition in the form of paste with a sponge, followed by immediately wiping off the composition with a flannel to produce a test plate having a wax coating layer.

(Evaluation Test)

Wiping-off Property

In the above-mentioned step for wiping off the composition with a flannel in forming the wax coating layer, the wiping-off property is evaluated by a force required for wiping-off of wax (weight for wiping-off). When the composition is completely wiped-off very easily, the wiping-off property is evaluated as A, when the composition is completely wiped-off easily, the wiping-off property is evaluated as B, when the composition partly remains even if a force is applied, the wiping-off property is evaluated as C, and when the composition is hardly wiped off even if a force is applied, the wiping-off property is evaluated as D.

Gloss of Surface

In the above-mentioned step for wiping off the composition with a flannel in forming the wax coating layer, a gloss of a surface of the test plate after wiping-off of wax is evaluated with naked eyes. A gloss higher than that before treating with wax is evaluated as A, a gloss lower than that before treating with wax is evaluated as B, and a surface being free from a gloss and scratched is evaluated as C.

Stain-proofing Property

The test plate is set being inclined at an angle of 30° in the direction of south-west on a roof of 3-storied building in Osaka Prefecture and is subjected to one-month and six-month outdoor exposure. Lightness on the surface of the test plate is measured after the exposure with a color-difference meter (CR-300 available from Minolta Co., Ltd.) and a difference (ΔL) between the measured lightness and the initial lightness is assumed to be an index of the stain-proofing property. When the difference (ΔL) is from 0 to 3, the evaluation is represented by A: when ΔL is more than 3 and up to 5, the evaluation is represented by B: and when ΔL is more than 5, the evaluation is represented by C.

Water Contact Angle

The test plates subjected to one-month and six-month outdoor exposure in the above-mentioned stain-proof test are washed with flowing water and dried at room temperature. Then 0.03 ml of a droplet of deionized water is dropped on the surface of dried test plates and a contact angle of the water droplet is measured at 20° C. with a contact angle meter (model DCAA available from Kyowa Kagaku Kabushiki Kaisha).

EXAMPLES 2 to 9 AND COMPARATIVE EXAMPLES 1 TO 4

Wax compositions were prepared and test plates were produced in the same manner as in Example 1 except that each component and proportions thereof shown in Table 1 were used. Evaluation of the test plates was carried out in the same manner as in Example 1. The results are shown in Table 1.

EXAMPLE 10

A 200 ml stainless steel vessel was charged with an organic solvent (22 g of normal paraffin and 22 g of kerosene) and thereto was added a wax component (2 g of carnauba wax and 2 g of paraffin wax), followed by dissolving at 70° to 85° C. and sufficiently mixing with a stirrer. Then 40 g of an organometallic compound A-1 was added thereto and sufficiently mixed with a stirrer to be dispersed. Lastly, a filler (5 g of calcium carbonate and 5 g of silicic anhydride powder) and photo-catalyst particles (2 g of anatase-type titanium dioxide powder) were added, followed by sufficiently mixing with a stirrer to obtain a wax composition in the form of paste uniformly dispersed.

A test plate was produced in the same manner as in Example 1 using the obtained wax composition and was evaluated in the same manner as in Example 1. The results are shown in Table 1.

EXAMPLE 11

A 200 ml stainless steel vessel was charged with an organic solvent (18 g of normal paraffin and 18 g of kerosene) and thereto was added a wax component (2 g of carnauba wax and 2 g of paraffin wax), followed by dissolving at 70° to 85° C. and sufficiently mixing with a stirrer. Then 50 g of an organometallic compound A-1 was added thereto and sufficiently mixed with a stirrer to be dispersed. Further 10 g of a sol of photo-catalyst particles was added, followed by sufficiently mixing with a stirrer to obtain a wax composition in the form of liquid uniformly dispersed.

A test plate was produced in the same manner as in Example 1 using the obtained wax composition and was evaluated in the same manner as in Example 1. The results are shown in Table 1.

EXAMPLE 12

A 200 ml stainless steel vessel was charged with an organic solvent (23 g of normal paraffin and 23 g of kerosene) and thereto was added a wax component (2 g of carnauba wax and 2 g of paraffin wax), followed by dissolving at 70° to 85° C. and sufficiently mixing with a stirrer. Then 50 g of an organometallic compound A-1 was added thereto and sufficiently mixed with a stirrer to be dispersed to obtain a wax composition in the form of liquid uniformly dispersed.

A test plate was produced in the same manner as in Example 1 using the obtained wax composition and was evaluated in the same manner as in Example 1. The results are shown in Table 1.

TABLE 1

| | Example | | | | | | | | | | | | Comparative Example | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 |
| Wax composition (parts by weight) Organometallic compound | | | | | | | | | | | | | | | | |
| A-1 | 40 | | | | | | | | | 40 | 50 | 50 | | | | |
| A-2 | | 40 | | | | | | | | | | | | | | |
| A-3 | | | 40 | | | | | | | | | | | | | |
| A-4 | | | | 40 | | | | | | | | | | | | |
| A-5 | | | | | 40 | | | | | | | | | | | |
| A-6 | | | | | | 40 | | | | | | | | | | |
| A-7 | | | | | | | 40 | | | | | | | | | |
| A-8 | | | | | | | | 40 | | | | | | | | |
| A-9 | | | | | | | | | 40 | | | | | | 10 | |
| A-10 | | | | | | | | | | | | | 40 | | | 40 |
| Wax component | | | | | | | | | | | | | | | | |
| B-1 | 2 | 2 | 2 | 2 | 2 | 2 | 2 | 2 | 2 | 2 | 2 | 2 | 2 | 20 | 20 | 0 |
| B-2 | 2 | 2 | 2 | 2 | 2 | 2 | 2 | 2 | 2 | 2 | 2 | 2 | 2 | 20 | 20 | 0 |
| Filler | | | | | | | | | | | | | | | | |
| C-1 | 5 | 5 | 5 | 5 | 5 | 5 | 5 | 5 | 5 | 5 | 0 | 0 | 5 | 5 | 5 | 0 |
| C-2 | 5 | 5 | 5 | 5 | 5 | 5 | 5 | 5 | 5 | 5 | 0 | 0 | 5 | 5 | 5 | 0 |
| Photo-catalyst particles | | | | | | | | | | | | | | | | |
| E-1 | 0 | 0 | 0 | 0 | 0 | 0 | 0 | 0 | 0 | 2 | 0 | 0 | 0 | 0 | 0 | 0 |
| E-2 | 0 | 0 | 0 | 0 | 0 | 0 | 0 | 0 | 0 | 0 | 10 | 0 | 0 | 0 | 0 | 0 |

TABLE 1-continued

|  | Example | | | | | | | | | | | | Comparative Example | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 | 4 |
| Organic solvent | | | | | | | | | | | | | | | | |
| D-1 | 23 | 23 | 23 | 23 | 23 | 23 | 23 | 23 | 23 | 22 | 18 | 23 | 23 | 25 | 20 | 30 |
| D-2 | 23 | 23 | 23 | 23 | 23 | 23 | 23 | 23 | 23 | 22 | 18 | 23 | 23 | 25 | 20 | 30 |
| Total | 100 | 100 | 100 | 100 | 100 | 100 | 100 | 100 | 100 | 100 | 100 | 100 | 100 | 100 | 100 | 100 |
| Characteristics of wax coating layer | | | | | | | | | | | | | | | | |
| Wiping-off property | B | B | B | B | B | B | B | B | B | B | A | A | B | B | B | D |
| Gloss of surface | A | A | A | A | A | A | A | A | A | A | A | A | A | A | A | C |
| Water contact angle (degree) | | | | | | | | | | | | | | | | |
| one-month exposure | 48 | 45 | 38 | 43 | 40 | 49 | 48 | 52 | 50 | 35 | 32 | 40 | 85 | 102 | 80 | 30 |
| six-month exposure | 46 | 47 | 36 | 42 | 41 | 48 | 49 | 50 | 51 | 36 | 35 | 39 | 82 | 95 | 75 | 60 |
| Stain-proofing property | | | | | | | | | | | | | | | | |
| one-month exposure | A | A | A | A | A | A | A | A | A | A | A | A | B | B | B | A |
| six-month exposure | A | A | A | A | A | A | A | A | A | A | A | A | C | C | C | B |

INDUSTRIAL APPLICABILITY

According to the present invention, there is provided a hydrophilizable wax coating layer having a hydrophilic surface, and a gloss and long-lasting stain-proofing property can be obtained.

The invention claimed is:

1. A hydrophilizable wax composition comprising a hydrophilizing agent having hydrolyzable groups which are converted into hydrophilic groups by hydrolysis in the presence of water and simultaneously condensed to enable the hydrophilizing agent to have a higher molecular weight, and a wax component, said wax composition forming a hydrophilizable wax coating layer when applied to a substrate and wiped off, and said hydrophilizing agent is a tetra-functional hydrolyzable silane compound, an oligomer thereof or a co-oligomer thereof, said tetra-functional hydrolysable silane compound is represented by the formula:

Si(OR$^1$)$_4$ wherein R$^1$ are the same or different and at least one of R$^1$ is a fluorine-containing organic group which has 1 to 1,000 carbon atoms and may contain oxygen atom, excepting oxygen atom at an end of molecular chain, nitrogen atom, and/or chlorine atom, and R$^1$ other than said fluorine-containing organic group are the same or different and each is hydrogen atom, a siloxane residue or a monovalent organic group which has 1 to 1,000 carbon atoms and may contain oxygen atom, excepting oxygen atom at an end of molecular chain, nitrogen atom, and/or chlorine atom.

2. The wax composition of claim 1 which further contains a filler.

3. The wax composition of claim 1 which does not contain a filler.

4. The wax composition of claim 1 which further contains an organic solvent.

5. The wax composition of claim 1 which further contains photo-catalyst particles.

6. A method of forming, on a surface of a substrate, a hydrophilizable wax coating layer being glossy and having durability, which comprises applying the hydrophilizable wax composition of claim 1 on the surface of the substrate and wiping off the composition, thereby converting hydrolyzable groups of the hydrophilizing agent into hydrophilic groups in the presence of water and simultaneously condensing the hydrophilizing agent to make a molecular weight thereof higher, wherein said hydrophilizing agent is a tetra-functional hydrolyzable silane compound, an oligomer thereof or a co-oligomer thereof, said tetra-functional hydrolysable silane compound is represented by the formula:

Si(OR$^1$)$_4$ wherein R$^1$ are the same or different and at least one of R$^1$ is a fluorine-containing organic group which has 1 to 1,000 carbon atoms and may contain oxygen atom, excepting oxygen atom at an end of molecular chain, nitrogen atom, and/or chlorine atom, and R$^1$ other than said fluorine-containing organic group are the same or different and each is hydrogen atom, a siloxane residue or a monovalent organic group which has 1 to 1,000 carbon atoms and may contain oxygen atom, excepting oxygen atom at an end of molecular chain, nitrogen atom, and/or chlorine atom.

7. The method of claim 6, wherein said wax composition is applied directly to the surface of a substrate and wiped off.

8. The method of claim 6, wherein said wax composition is applied to a surface of coating film on the substrate and wiped off.

9. The method of claim 6, wherein said substrate is a metallic substrate, plastic substrate, ceramic substrate or wood.

10. The method of claim 9, wherein said ceramic substrate is a glass substrate, concrete substrate, mortar substrate, tile or natural stone.

11. A method of repairing a scaled portion of a coating film on a substrate to make a surface thereof hydrophilic and glossy, which comprises applying the hydrophilizable wax composition of claim 1 on the scaled portion of the coating film on the substrate and wiping off the composition, thereby converting hydrolyzable groups of the hydrophilizing agent into hydrophilic groups in the presence of water, and simultaneously condensing the hydrophilizing agent to make a molecular weight thereof higher, thus forming a layer of the hydrophilizable wax composition at least on the scaled portion of the coating film, wherein said hydrophilizing agent is a tetra-functional hydrolyzable silane compound, an oligomer thereof or a co-oligomer thereof, said tetra-functional hydrolysable silane compound is represented by the formula:

$$Si(OR^1)_4$$

wherein $R^1$ are the same or different and at least one of $R^1$ is a fluorine-containing organic group which has 1 to 1,000 carbon atoms and may contain oxygen atom, excepting oxygen atom at an end of molecular chain, nitrogen atom, and/or chlorine atom, and $R^1$ other than said fluorine-containing organic group are the same or different and each is hydrogen atom, a siloxane residue or a monovalent organic group which has 1 to 1,000 carbon atoms and may contain oxygen atom, excepting oxygen atom at an end of molecular chain, nitrogen atom, and/or chlorine atom.

12. The repairing method of claim 11, wherein said substrate is a metallic substrate, plastic substrate, ceramic substrate or wood.

13. The method of claim 12, wherein said ceramic substrate is a glass substrate, concrete substrate, mortar substrate, tile or natural stone.

14. A wax-coated article having a layer of the hydrophilizable wax composition of claim 1 as an outermost layer.

15. The wax-coated article of claim 14, wherein the article is a car body.

* * * * *